United States Patent
Fukui et al.

(10) Patent No.: US 10,157,056 B2
(45) Date of Patent: Dec. 18, 2018

(54) DEVICE, METHOD, AND PROGRAM FOR VISUALIZING DEPENDENT PORTIONS OF PROGRAM

(71) Applicant: HITACHI, LTD., Tokyo (JP)

(72) Inventors: Daisuke Fukui, Tokyo (JP); Genta Koreki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/515,057

(22) PCT Filed: Dec. 5, 2014

(86) PCT No.: PCT/JP2014/082327
§ 371 (c)(1),
(2) Date: Mar. 28, 2017

(87) PCT Pub. No.: WO2016/088271
PCT Pub. Date: Jun. 9, 2016

(65) Prior Publication Data
US 2017/0220339 A1    Aug. 3, 2017

(51) Int. Cl.
*G06F 9/44* (2018.01)
*G06F 8/73* (2018.01)
*G06F 8/41* (2018.01)
*G06F 8/77* (2018.01)
*G06F 9/451* (2018.01)

(52) U.S. Cl.
CPC ............... *G06F 8/73* (2013.01); *G06F 8/433* (2013.01); *G06F 8/77* (2013.01); *G06F 9/454* (2018.02)

(58) Field of Classification Search
None
See application file for complete search history.

(56) References Cited

U.S. PATENT DOCUMENTS

2004/0025152 A1\* 2/2004 Ishizaki ................. G06F 8/445
717/159
2006/0130040 A1\* 6/2006 Subramanian ............ G06F 8/65
717/168

FOREIGN PATENT DOCUMENTS

| JP | 2007-128193 A | 5/2007 |
| JP | 2007-310727 A | 11/2007 |
| JP | 2009-098872 A | 5/2009 |
| JP | 2014-089568 A | 5/2014 |

OTHER PUBLICATIONS

International Search Report, PCT/JP2014/082327, dated Jan. 13, 2015, 2 pgs.
Japanese Office Action dated Aug. 22, 2017 for the Japanese Application No. 2016-562187.

\* cited by examiner

*Primary Examiner* — Qamrun Nahar
(74) *Attorney, Agent, or Firm* — Volpe and Koenig, P.C.

(57) ABSTRACT

The present invention provides information for making a decision so as to efficiently localize environment-dependent portions of a program. Man-hours required to localize the environment-dependent portions are calculated by means of a unique method using program structure data and environment-dependent portions data. An effect of localizing the environment-dependent portions is calculated and visualized based on a Lorenz curve and a Gini coefficient.

15 Claims, 6 Drawing Sheets

ENVIRONMENT-DEPENDENT PORTIONS DATA

| FILENAME | MODULE NAME | LINE NUMBER | TYPE OF DEPENDENCE |
|---|---|---|---|
| FileA | ModuleA | 11<br>30 | char type<br>signed/unsigned<br>shift operation |
| | ModuleB | 23 | int type length |
| FileB | ModuleC | 35 | shift operation |
| FileC | ModuleD | 46 | endian |
| ... | | ... | ... |

PROGRAM STRUCTURE DATA        212

| FILENAME | MODULE NAME | TYPE | SCOPE | REFERENCED BY | NO. OF LINES |
|---|---|---|---|---|---|
| FileA | ModuleA | Function | global | ModuleB ModuleC | 45 |
| | ModuleB | Variable | static | ModuleC | 30 |
| FileB | ModuleC | Macro | global | - | 22 |
| FileC | ModuleD | Function | static | ModuleA | 50 |
| ... | ... | ... | ... | ... | |

DEVICE, METHOD, AND PROGRAM FOR VISUALIZING DEPENDENT PORTIONS OF PROGRAM

TECHNICAL FIELD

The present invention relates to a technology for visualizing a program's structure and characteristic.

BACKGROUND ART

In general, a program (synonymous with source codes herein) depends on any device (CPU and periphery equipment), middleware such as OS, and a library. For example, an instruction set designed for exclusive use for a particular CPU does not work with another CPU that does not support the instruction set. Similarly, a program that depends on a particular OS and library does not work with another OS and another library that are not compatible with the OS and library. This may pose a problem when porting a program from an execution environment to another execution environment. The reason is that, if portions dependent on a particular execution environment (hereinafter simply referred to as environment-dependent portions), existing within a program, exist everywhere in the program, there is an increase in man-hours for modification when porting the program to another execution environment.

As a method for avoiding this problem a method of gathering (localizing) environment-dependent portions which exist, distributed within a program into one file (source file) is commonly used. Gathering environment-dependent portions existing within a program into one file enables confining segments subject to modification and minimizing man-hours for modification.

However, it is often the case that, in the beginning of developing a program, porting the program to another execution environment is not foreseen. Alternatively, even in a case where, in the beginning of development, porting a program to another environment is foreseen and a design to localize environment-dependent portions was adopted, environment-dependent portions may sometimes be distributed to diverse files along with advance of the development. To enhance portability of such a program, it is desirable to identify environment-dependent portions distributed within the program and localize environment-dependent portions.

As a tool to identify environment-dependent portions distributed within a program, there is, inter alia, a MISRA-C rule checker; this is a coding guideline for C language developed by MISRA (an abbreviation of Motor Industry Software Reliability Association, a registered trademark). MISRA-C is a coding guideline intended to ensure the safety, portability, and reliability of programs and includes a variety of rules to identify environment-dependent portions. There is also a technology for extracting microcomputer-dependent portions by estimating a variable to store an address in hexadecimal notation as a hardware register variable, e.g., as in Patent Literature (PTL) 1.

CITATION LIST

Patent Literature

PTL 1: Japanese Patent Application Laid-Open No. 2014-89568

SUMMARY OF INVENTION

Technical Problem

If the MISRA-C checker or the technology for extracting environment-dependent portions described in PTL 1, it is possible to identify environment-dependent portions of a program. However, if there are a quite a lot of environment-dependent portions that have been identified, there are problems noted below.

It is difficult to determine to what extent environment-dependent portions are distributed to a plurality of files and directories.

It is difficult to estimate man-hours for modification required to localize environment-dependent portions.

It is difficult to determine with which environment-dependent portion to begin localization.

The present invention is intended to solve the above problems.

Solution to Problem

One aspect of the present invention to address the above-noted problems resides in a device for visualizing dependent portions of a program, the device including an input device, an output device, an arithmetic device, and a storage device. In this device, the arithmetic device is configured such that it can make use of environment-dependent portions data which has been stored in the storage device or which is input from the input device. The environment-dependent portions data includes information regarding a plurality of programs belonging to, e.g., a predefined project or a predefined database and has tuples of information identifying each of the programs and data relevant to environment-dependent portions included in the programs. The arithmetic device includes a visualization processing unit, an environment-dependent portions aggregation processing unit, a localization man-hours calculation processing unit, and a degree of dependence on environment calculation processing unit.

The environment-dependent portions aggregation processing unit identifies environment-dependent portions in each of the programs, based on the environment-dependent portions data. The localization man-hours calculation processing unit calculates localization man-hours for each of the identified environment-dependent portions, based on information corresponding to the identified environment-dependent portions. The visualization processing unit aggregates values of localization man-hours for each of the programs, based on the calculated localization man-hours. The degree of dependence on environment calculation processing unit calculates a Lorenz curve and a Gini coefficient for grasping a degree of how an event is concentrated, based on the aggregated values of localization man-hours per program, and the output device displays information based on the calculated Lorenz curve and Gini coefficient.

The environment-dependent portions data is, for example, a database in table form and includes at least one of a filename and a module name as information identifying each of the programs. It includes, e.g., a type of dependence on environment indicating a type of each of the environment dependent portions as data relevant to environment-dependent portions included in the programs. It may also include information indicating a line in a program, the line where each environment-dependent portion exists. As types of independence on environment, various definitions such as, e.g. char type signed/unsigned, shift operation, int type length, and endian are conceivable.

The visualization processing unit may have a function to allow a user to specify at least one of the filename and module name as units of visualization. Moreover, as a preferable example, the environment-dependent portions aggregation processing unit aggregates the number of environment-dependent portions according to the type of dependence on environment for each of the units of visualization and the localization man-hours calculation processing unit calculates localization man-hours for each of the identified environment-dependent portions, using at least one of information indicating the number of environment-dependent portions and the type of dependence on environment indicating the type of each of the environment-dependent portions. Thereby, it is possible evaluate man-hours with respect to each type of an environment-dependent portion.

Moreover, as a more preferable example, the arithmetic device is configured such that it can make use of program structure data which has been stored in the storage device or which is input from the input device. The program structure data includes information regarding a plurality of programs and has tuples of information identifying each of the programs and data relevant to at least one of information relevant to the programs' function, characteristic, complexity, and size. The localization man-hours calculation processing unit calculates localization man-hours for each of the identified environment-dependent portions, using at least one of information relevant to the programs' function, characteristic, complexity, and size.

As above, in a preferable concrete example of the present invention, man-hours for localizing environment-dependent portions are calculated using environment-dependent portions data and program structure data. From the environment-dependent portions data, the number and types of environment-dependent portions in a program can be identified. Moreover, from the program structure data, the function, characteristic, complexity, and size of a program in which environment-dependent portions exist can be identified. Use of these items of information enables it to estimate man-hours for localizing each environment-dependent portion. Then, by displaying the estimated man-hours using a Lorenz curve and a Gini coefficient, it is possible to determine with which program to begin localization processing for effective execution among a set of programs belonging to a predefined project or database.

Another aspect of the present invention resides in a method for visualizing dependent portions of a program to be performed using an information processing device comprising an input device, an output device, an arithmetic device, and a storage device. The arithmetic device can make use of environment-dependent portions data which has been stored in the storage device or which is input from the input device. The environment-dependent portions data includes information regarding a plurality of programs and has tuples of information identifying each of the programs and data relevant to environment-dependent portions included in the programs.

The arithmetic device executes an environment-dependent portions aggregation step that identifies environment-dependent portions in each of the programs, based on the environment-dependent portions data, a localization man-hours calculation step that calculates localization man-hours for each of the identified environment-dependent portions, based on information corresponding to the identified environment-dependent portions, a localization man-hours aggregation step that aggregates values of localization man-hours for each of the programs, based on the calculated localization man-hours, and a visualization step that calculates a Lorenz curve and a Gini coefficient for grasping a degree of how an event is concentrated, based on the aggregated values of localization man-hours per program. The output device displays the calculated Lorenz curve and Gini coefficient.

Another aspect of the present invention resides in a program for visualizing dependent portions of a program, causing an information processing device including an input device, an output device, an arithmetic device, and a storage device to function as means for visualizing dependent portions of a program in response to an instruction from outside. This program causes the information processing device to function as if it includes a an environment-dependent portions aggregation processing unit that identifies environment-dependent portions of the program, based on environment-dependent portions data which has been read in from a database program and aggregates the number of environment-dependent portions for each of source files constituting a program or for each directory including the source files and a visualization processing unit that visualizes a Lorenz curve, based on the number of the environment-dependent portions aggregated by the environment-dependent portions aggregation processing unit. Visualization processing includes processing to display an image of a Lorenz curve as is and processing to display data based on the Lorenz curve.

Moreover, this program preferably causes the information processing device to operate as if it includes the environment-dependent portions aggregation processing unit that identifies types of the environment-dependent portions from the environment-dependent portions data which has been read in from the database program and aggregates the number of the environment-dependent portions for each type of the environment-dependent portions in response to an instruction from outside and the visualization processing unit that visualizes a Lorenz curve, based on the number of the environment-dependent portions aggregated for each type of the environment-dependent portions by the environment-dependent portions aggregation processing unit.

Moreover, this program preferably causes the information processing device to operate as if it includes a localization man-hours calculation processing unit that identifies modules including the environment-dependent portions from the environment-dependent portions data which has been read in from the database program and calculates man-hours for localizing the environment-dependent portions, based on the number and types of the environment-dependent portions that the modules include, and the visualization processing unit that visualizes a Lorenz curve, based on the man-hours for localizing the environment-dependent portions and the number of the environment-dependent portions aggregated by the environment-dependent portions aggregation processing unit.

Moreover, this program preferably causes the information processing device to operate as if it includes the localization man-hours calculation processing unit that identifies a scope and metrics and a dependence relationship of the modules from program structure data which has been read in from the database program and calculates man-hours for localizing the environment-dependent portions, based on these items of data, and the visualization processing unit that visualizes a Lorenz curve, based on the man-hours for localizing the environment-dependent portions and the number of the environment-dependent portions aggregated by the environment-dependent portions aggregation processing unit.

Advantageous Effects of Invention

According to one of aspects of the present invention, it is possible to judge with ease a degree of how environment-dependent portions of a program are distributed to a plurality of files. Advantageous effects other than described above will be clarified through description of an example of embodiment.

DESCRIPTION OF EMBODIMENTS

In the following, an embodiment of the present invention will be described in detail with the aid of the drawings. However, the present invention should not be construed to be limited to the following description of the embodiment. Those skilled in the art will easily appreciate that a concrete configuration of the present invention may be modified without departing from the idea and spirit of the invention In a configuration of the present invention, which will be described hereinafter, to identify same components or components having a same function, same reference numerals are used commonly across different drawings, and duplicated description may be omitted.

Notation of "first", "second", "third", etc. herein is affixed to identify a component, but it is not necessarily intended to qualify a number or sequence. Moreover, numbers to identify components are used a per-context basis and a number used in one context does not always denote the same component in another context. Additionally, it is not improbable that a component identified by a number also functions as a component identified by another number.

Position, size, shape, range, etc. of each component depicted in a drawing or the like may not represent its actual position, size, shape, range, etc. to facilitate understanding of the invention. Hence, the present invention is not necessarily to be limited to position, size, shape, range, etc. disclosed in a drawing or the like.

A component mentioned herein in singular form may be those in plural form, unless otherwise specified explicitly in a context.

EXAMPLE

Figure 1:
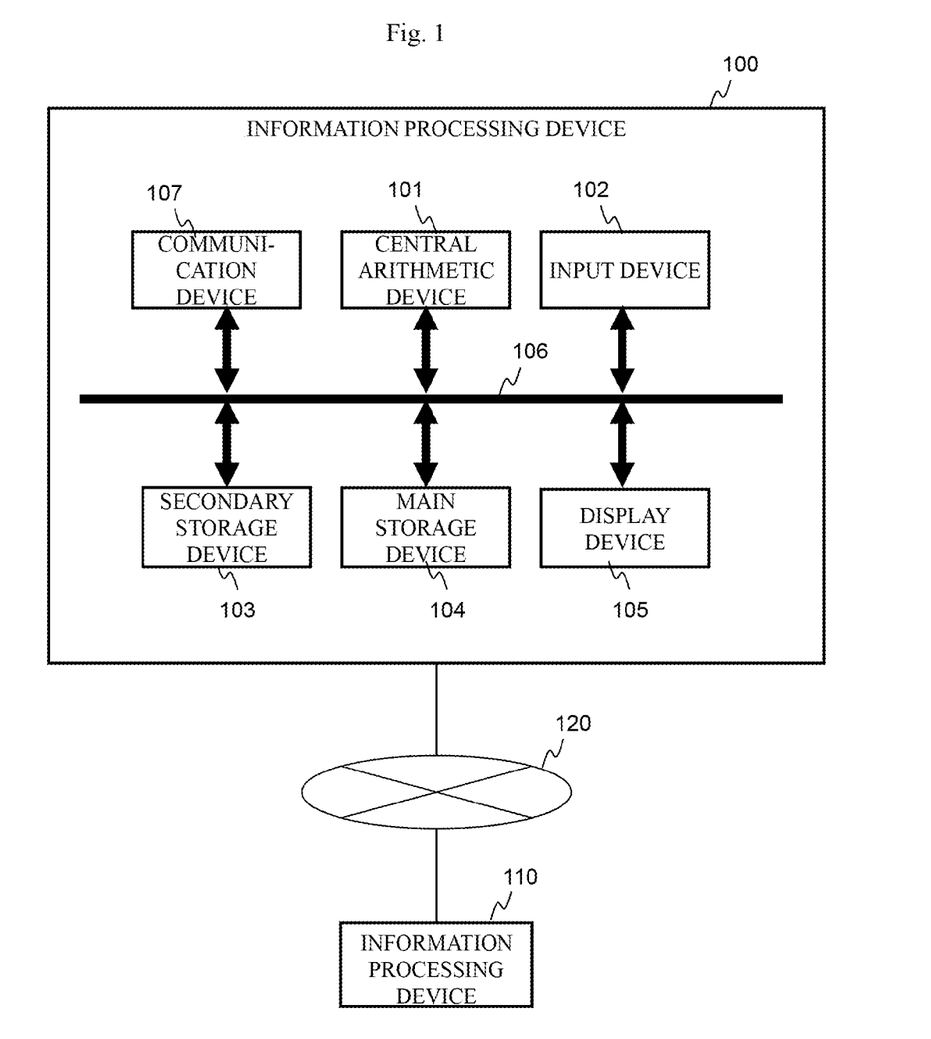
FIG. 1 is a block diagram depicting an example of a hardware configuration of the present invention.

FIG. 1 is an example of a hardware configuration of the present invention. This configuration, as the hardware of an information processing device 100, includes a central arithmetic device 101, an input device 102 such as a keyboard and a mouse, a secondary storage device 103 such as a hard disk, a main storage device 104 such as DRAM, a display device 105 such as a display, and a communication device 107. And now, the respective devices are connected by a bus 106 and data can be sent and received mutually between the respective devices. Additionally, the information processing device 100 can connect with another information processing device 110 having the same hardware configuration as the information processing device 100 via a communication network 120 such as Internet. The above hardware structure is exemplary and no limitation to this is intended.

Figure 2:
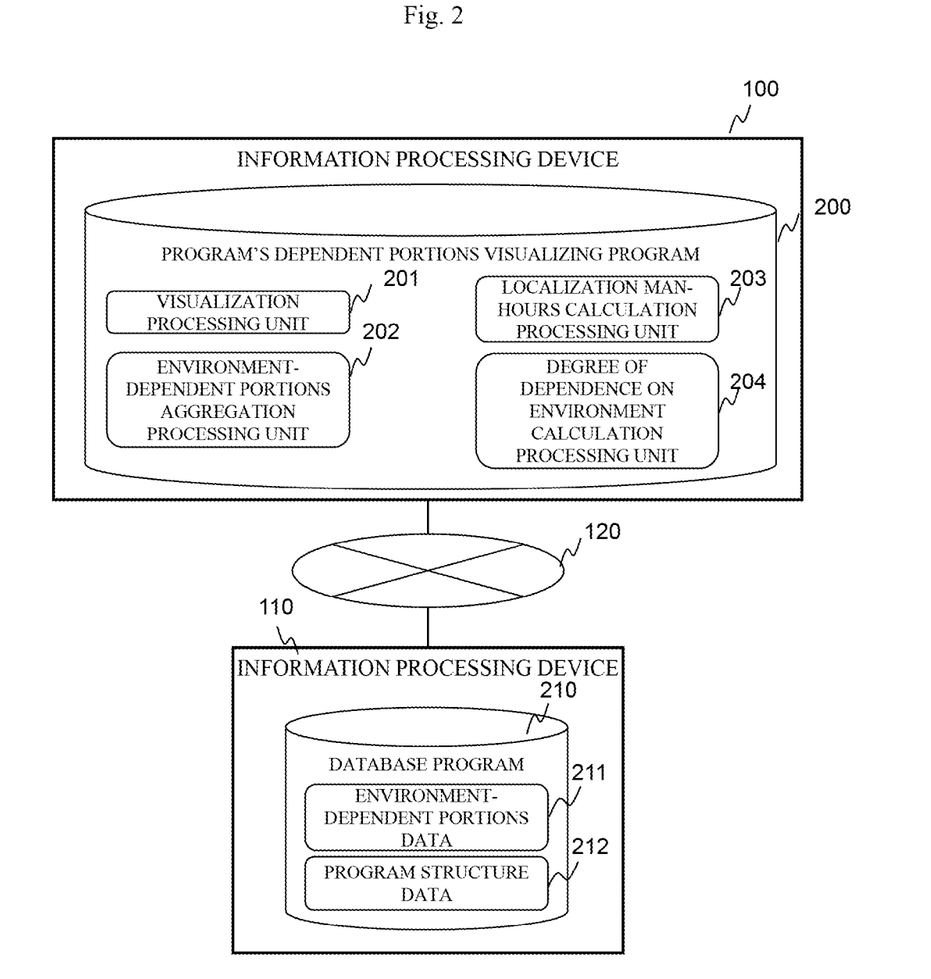
FIG. 2 is a functional block diagram depicting an example of a software configuration of the present invention.

FIG. 2 is an example of a software configuration of the present invention. A program's dependent portions visualizing program 200 is a program for visualizing a program chart pertaining to the present invention and is composed of a visualization processing unit 201, environment-dependent portions aggregation processing unit 202, localization man-hours calculation processing unit 203, a degree of dependence on environment calculation processing unit 204. What is processed by a program abstract chart creating program 200 will be described in detail with FIG. 5.

A database program 210 is a commonly used database program capable of storing arbitrary data and, in the present invention, stores environment-dependent portions data 211 and program structure data 212. Environment-dependent portions data 211 and program structure data 212 are described in detail with FIG. 3 and FIG. 4, respectively. Use of the database program 210 is not indispensable; alternatively, environment-dependent portions data 211 and program structure data 212 may be stored in the secondary storage device 103 as file data. Moreover, environment-dependent portions data 211 is necessary data in the present invention, but program structure data 212 may be dispensable.

The program's dependent portions visualizing program 200 and the database program 210 are programs that are retained in the secondary storage device 103 of the information processing device and are read into the main storage device 104 and executed by the central arithmetic device 101. An OS (Operating System) or the like engages in executing these programs, but this is self-evident and, therefore, explanation and description about this are omitted. Moreover, these programs may be executed on the same information processing device 100 or respectively executed separately on separate information processing devices 100 and 110 via the network 120.

Figure 3:
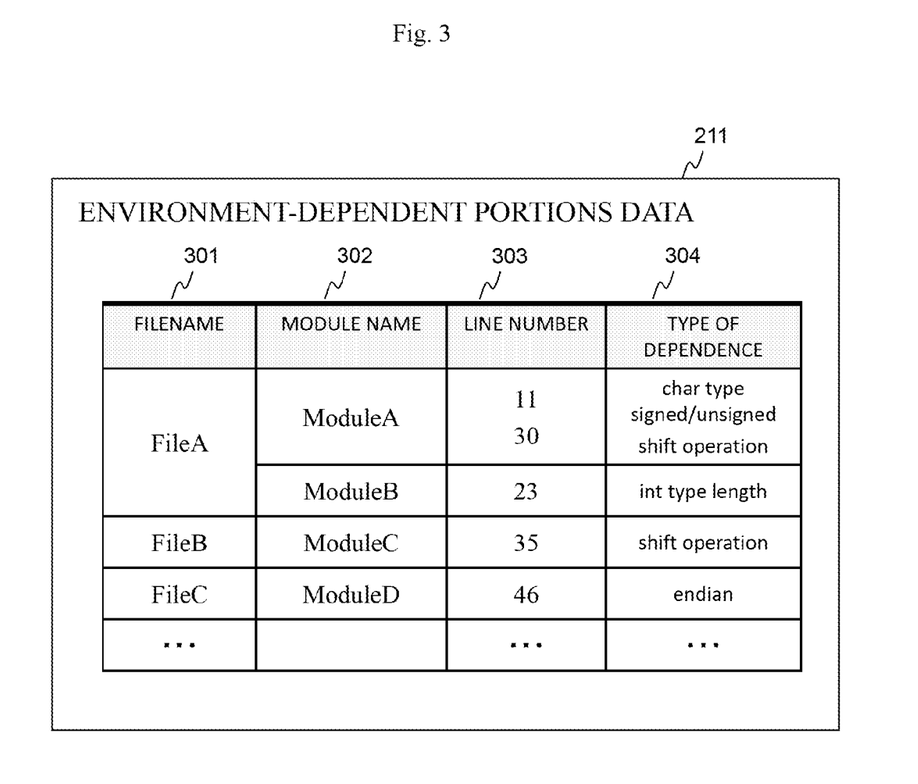
FIG. 3 is a table diagram illustrating an example of a database table representing environment-dependent portions data 211.

FIG. 3 is an example of a database table representing environment-dependent portions data 211. Environment-dependent portions data is data representing environment-dependent portions extracted by using an analysis tool having a function of extracting environment-dependent portions, such as a MISRA-C checker. Since there are various analysis tools that can be used and various means for storing an analysis result into the database, description about them is omitted here.

A column 301 is a column that stores a filename of source codes constituting a program. A column 302 is a column that stores the name of a module of every kind which is defined within the source codes. For example, a function name, a variable name, a macro name, etc. will correspond to a module name. A column 303 stores a line number to indicate the position of an environment-dependent portion within the source codes. A column 304 stores a string representing a type of an environment-dependent portion (hereinafter referred to as a type of dependence on environment). For example, in a C language, a default sign setting (signed or unsigned) of a char type (one of data types in a programming language, a data type for storing one character) is determined depending on an environment. Thus, a segment in which a char type was declared can be classified as a "char type signed/unsigned" environment-dependent portion. Other examples of types of dependence are as follows: width in bits (16 bits or 32 bits among others) of an int type (one of data types in a programming language, a data type for storing an integer, with some variants according to whether it is signed or unsigned and data length); endian (referring to how data (bytes) is ordered within a memory and sorted as big or little endian according to ordering); shift operation; and others. A structure of environment-dependent portions data 211 illustrated in FIG. 3 is exemplary and no limitation to this form is intended. Such structure is capable of storing several kinds of environment-dependent portions that can be extracted by an analysis tool such as the above-mentioned MISRA-C checker.

Environment-dependent portions data 211 is created manually or automatically based on a result of analyzing source codes with an analysis tool performed in advance and stored beforehand in the storage device of the information processing device 110.

Figure 4:
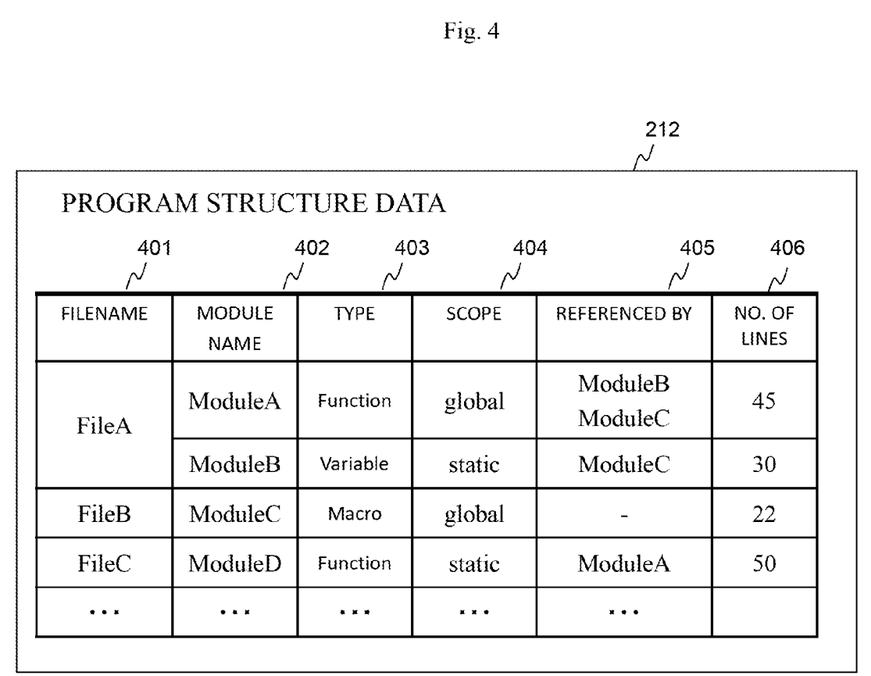
FIG. 4 is a table diagram illustrating an example of a database table representing program structure data 212.

FIG. 4 is an example of a database table representing program structure data 212. Program structure data is data representing a program structure analyzed by using a program structure analysis tool such as Doxygen. Since there are various analysis tools that can be used and various means for storing an analysis result into the database, description about them is omitted here.

A column 401 is a column that stores a filename of source codes constituting a program, as the column 301 does. A column 402 is a column that stores the name of a module of every kind which is defined within the source codes, as the column 302 does. A column 403 is a column that stores a string representing a module type such as "function", "variable", or "macro". A column 404 is a column that stores a string representing a scope of the module such as static (access is only permitted from that file) or global (access is permitted from any file). A column 405 is a column that stores a string representing the identifier of another module to which the module in the module name column refers (call or read-in among others). Although, in FIG. 4, a module name is described in the column 405 to simplify the description, no limitation to this is intended; this column may store any identifier that can identify a module uniquely. A structure of program structure data 212 illustrated in FIG. 4 is exemplary and no limitation to this form is intended. Such structure is capable of storing several kinds of data that can be analyzed by an analysis tool such as the above-mentioned Doxygen. As data other than mentioned above, it is conceivable that metrics data 406 such as, e.g., module complexity and the number of lines, is included in the program structure data 212. In FIG. 4, the number of lines is stored as metrics data 406. Program structure data 212 is created manually or automatically based on a result of analyzing a program with an analysis tool performed in advance and stored beforehand in the storage device of the information processing device 110.

Figure 5:
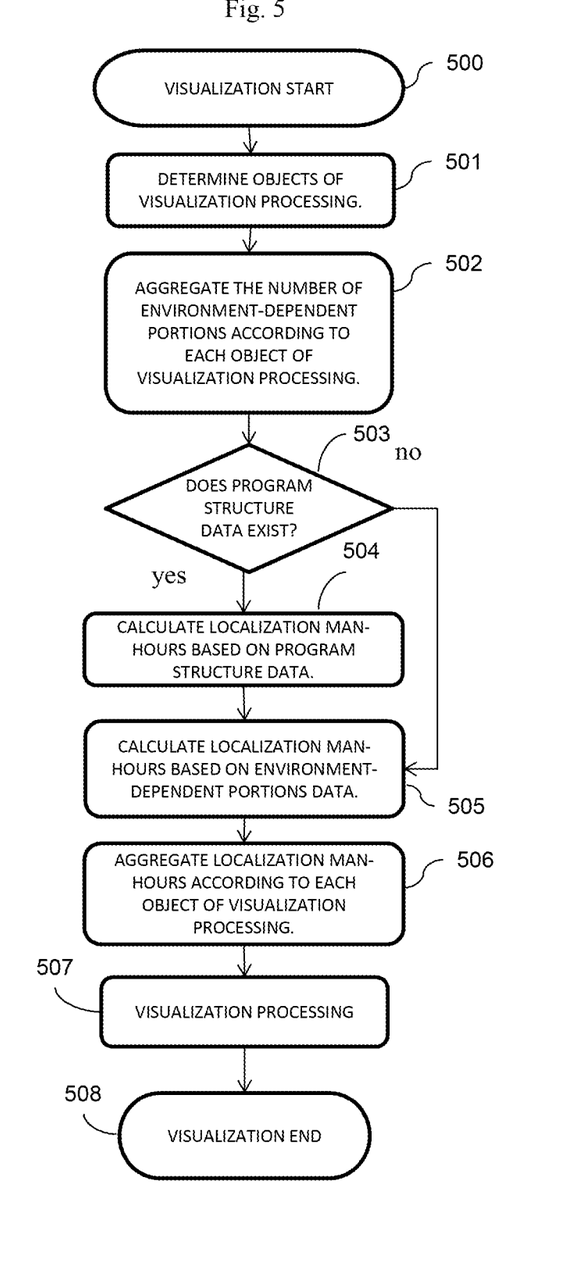
FIG. 5 is a flowchart diagram illustrating a basic process of visualizing environment-dependent portions.

FIG. 5 is a flowchart illustrating a basic process of visualizing environment-dependent portions. Step 500 is a step to start the process of visualizing environment-dependent portions. The visualization processing unit 201 of the program's dependent portions visualizing program 200 accepts a general program call request such as a user request via GUI or an API call from another module and starts the visualization process.

Step 501 is a step in which the visualization processing unit 201 determines objects of visualization processing (including a type of dependence on environment, units of visualization, a program, etc.). A type of dependence on environment is data that is stored in the column 304 of the environment-dependent portions data 211 table in the present embodiment. Units of visualization represent string data, such as "file units", if environment-dependent portions are to be visualized in units of source files, and "directory units",
if those portions are to be visualized in units of directories storing source files. A program is a set of source codes constituting a program subject to visualization processing and, in many cases, refers to a root directory including all the source codes.

First, the visualization processing unit 201 acquires environment-dependent portions data 211 from the database program 210 and stores that data into the main storage device 140. However, this storing is not required, if that data has already been stored in the main storage device 104. In one way, all pieces of environment-dependent portions data 211 may be stored into the main storage device 104 at a time; in another way, a subset of that data may be read in as necessary from the database program 209. In the following context where environment-dependent portions data 211 is simply mentioned, that data means data stored into the main storage device 104 in this step.

Then, the visualization processing unit 201 presents data regarding type of dependence on environment and units of visualization to a user through GUI or the like and the user inputs a type of dependence on environment and units of visualization, subject to the visualization process, to the visualization processing unit 201 through a GUI input operation or the like. It is assumed in the present invention that units of visualization that can be selected by the user and a visualization logic associated therewith are hard coded in the program's dependent portions visualizing program 200, because they closely relate to the behavior of the program's dependent portions visualizing program 200; but, not limitation to this is intended. For example, using a commonly used plug-in form, it is also possible to add units of visualization and logic to the program's dependent portions visualizing program 200 later.

Step 502 is a step to aggregate the number of environment-dependent portions according to each of the objects of visualization processing determined in step 501. The visualization processing unit 201 outputs data corresponding to the objects of visualization processing (a type of dependence on environment, units of visualization) determined in step 501 and the environment-dependent portions data 211 read in step 501 to the environment-dependent portions aggregation processing unit 202. The environment-dependent portions aggregation processing unit 202 aggregates the number of environment-dependent portions according to the type of dependence on environment for each unit of visualization.

For instance, if the type of dependence on environment is "char type signed/unsigned" and the units of visualization is "file units", the processing unit 202 aggregates the number of pieces of environment-dependent portions data 211 meeting the type of dependence on environment of "char type signed/unsigned" with respect to each source file. To explain using FIG. 3, as the type of dependence on environment of "char type signed/unsigned", one entry exists for "FileA", whereas none of entry exists for "FileB". In this case, the number of environment-dependent portions in "FileA" is "1" and the number of environment-dependent portions in "FileB" is "0". In the same manner, the processing unit 202 aggregates the number of environment-dependent portions with respect to all source files. Data aggregated in this step by the environment-dependent portions aggregation processing unit 202 is output to the visualization processing unit 201.

Step 503 is a step in which the visualization processing unit 201 determines whether program structure data 212 is stored in the database program 210. If that data 212 is stored, the process goes to step 504; if not so, the process goes to step 505.

Step 504 is a step of processing to be executed, if program structure data 212 was found in step 503. First, the visualization processing unit 201 acquires program structure data 212 from the database program 210 and stores that data into the main storage device 104. This is the same as for reading in environment-dependent portions data 211 in step 501. Then, the visualization processing unit 201 outputs the program structure data 212 thus read in and the environment-dependent portions data 211 read in step 501 to the localization man-hours calculation processing unit 203.

Then, the localization man-hours calculation processing unit 203 calculates localization man-hours for each of environment-dependent portions stored in the environment-dependent portions data 211, based on data stored in the program structure data 212. For instance, if an environment-dependent portion exists within a module (function, variable, file, etc.) that has a structure as below, the processing unit 203 judges that the man-hours for localizing the environment-dependent portion are large.

The module is accessing a static global variable.
The module is accessing a static function.
The module is being referenced by any other module (having a dependence relation with the other module).

For example, a static variable can only be accessed from within a file and ongoing access to this variable makes it impossible to move the file to another location when localization is performed. Hence, it can be judged that the main-hours for localizing the module constrained as above (changing the source file) are large. Thus, at step 504, the man-hours for localizing an environment-dependent portion included in such a module are calculated, weighted with a given weight.

For example, conceivable is a method of calculation in which the man-hours for localizing an environment-dependent portion not included in such module are defaulted to "1" and the man-hours for localizing an environment-dependent portion included in such module are set to "1.5". A relationship between a kind of a program structure that raises the degree of difficulty in localization and an increase in localization man-hours is complicated and cannot be determined uniquely. In this regard, conceivable is a method in which a user of the program's dependent portions visualizing program 200 or the program itself calculates this, based on experience and actual performance in the past; however, a method of calculation is non-limiting in the present invention.

Although it is possible to evaluate how much localization main-hours are, using program structure data 212, as described above, the step 504 of calculating localization man-hours based on program structure data 212 may be dispensed with.

Step 505 is a step of calculating main-hours for localizing each environment-dependent portion, based on the environment-dependent portions data 211. The localization man-hours calculation processing unit 203 executes this processing step. If program structure data 212 was not found in step 503, the visualization processing unit 201 outputs the environment-dependent portions data 211 read in step 501 to the localization man-hours calculation processing unit 203. If the process proceeds from step S504 to step 505, the localization man-hours calculation processing unit 203 executes this step of processing, following the step 504.

In this step, if two environment-dependent portions of different types of dependence are included within a function, the processing unit 203 judges that localization main-hours for this function are large. The reason is that, since two different environment-dependent portions exist within the function, it is required to divide the function into two parts in order to localize these portions to separate source files. Hence, conceivable is a method of calculation in which, in FIG. 3, e.g., in the case of ModuleB having only one environment-dependent portion within the same module, the man-hours for localizing the environment-dependent portion are defaulted to "1" and, in the case of ModuleA in which two environment-dependent portions exist in the module, the man-hours for localizing them are set to "2".

Moreover, conceivable is a method of calculating localization man-hours according to a type of dependence. For example, with regard to a type of dependence such as "int type length" for which specifying bit length in a macro makes a solution, localization man-hours can be calculated to be low. Conceivable is also a method of calculating localization man-hours using metrics data 406. For instance, if it can be detected that the number of lines for a module is many from metrics data, it can be judged that localization man-hours regarding the module are large.

A relationship between data of the environment-dependent portions data 212 and an increase in localization man-hours is complicated and cannot be determined uniquely, as is the case for step 504. Although a method of this calculation is non-limiting particularly in the present invention, a rule that defines a weight for a predetermined condition that is foreseen to occur in environment-dependent portions data 211 may be prescribed beforehand and stored in a storage part of the localization man-hours calculation processing unit 203. Referring to the rule, the localization man-hours calculation processing unit 203 may make a judgment regarding input environment-dependent portions data 211. And now, in a simple method, it is also conceivable to simply count the number of modules in which environment-dependent portions are included or the number of environment-dependent portions without executing weighting and calculation noted above.

Step 506 is a step to aggregate the values of localization man-hours calculated in steps 504 and 505 according to each of the objects of visualization processing. This processing step is executed by the visualization processing unit 201. For instance, if units of visualization are "file units", the processing unit 201 calculates the sum of localization man-hours for localizing environment-dependent portions (all environment-dependent portions meeting the type of dependence on environment as a processing object to visualize environment-dependent portions) included within a source file.

Step 507 is a step to visualize a Lorenz curve, based on the obtained values as the sum of localization man-hours by each of the objects of visualization processing, calculated in step 506 and preceding steps. A Lorenz curve is a curve for visualizing a degree of how an event is concentrated (distributed) and is mostly used to visualize economic disparities among countries. In the present invention, a degree of how environment-dependent portions of a program are concentrated (localized) into a subset of source files is represented with a Lorenz curve.

Figure 6:
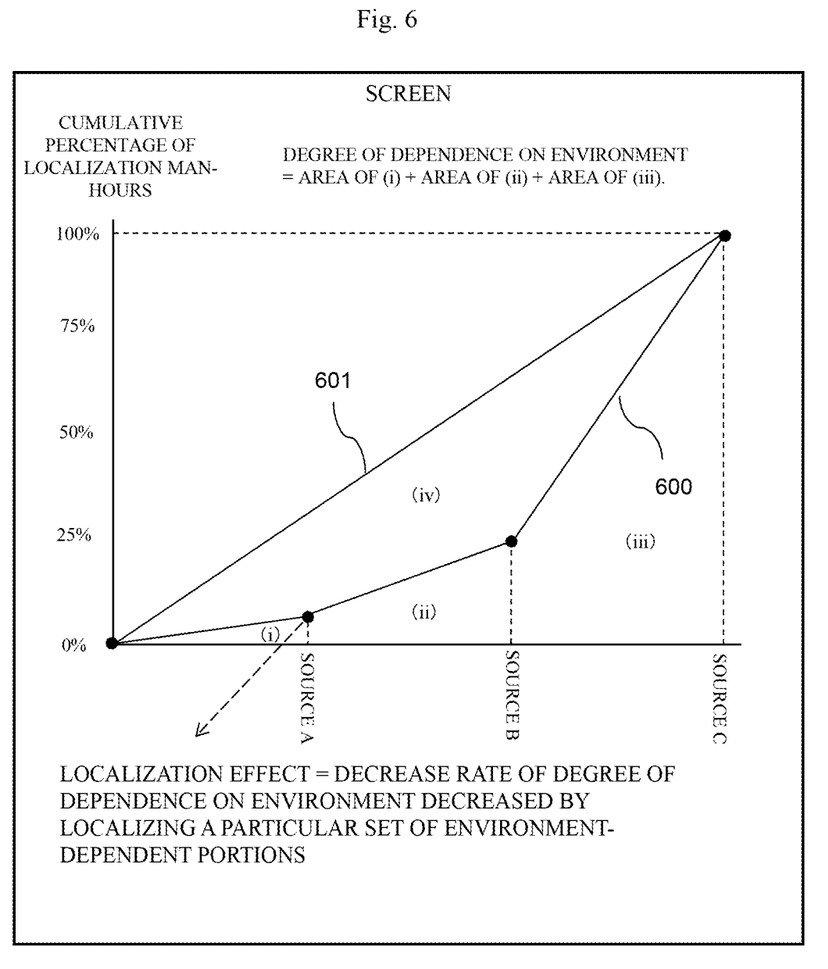
FIG. 6 is a graph diagram illustrating an example of a Lorenz curve that is visualized in step 507.

FIG. 6 is an example of a Lorenz curve 600 that is visualized in step 507 (In FIG. 6, a curve is not formed exactly, because units of visualization are three and the number of slots is small). Sources A to C which are units of visualization represent source files respectively (which are non-related to FileA and others mentioned in FIGS. 3 and 4). An X axis of the table indicates a cumulative number of sources in a general Lorenz curve, but source files (subject to visualization processing) are lined up in ascending order of values as the sum of localization man-hours in FIG. 6. Source filenames are lined up in ascending order of the sum values; e.g., the sum of localization man-hours for Source A is "1", the sum of localization man-hours for Source B is "2", and the sum of localization man-hours for Source C is "9". To do this, after localization man-hours per source file are aggregated in steps 504 to 506 in FIG. 5, source files may be sorted in ascending order of localization man-hours and plotted in order from a point nearer to the origin of the graph in FIG. 6. In FIG. 6, Sources A to C are plotted, evenly spaced apart, but no limitation to this is intended.

On a Y axis of the table, a cumulative percentage of the sum of localization man-hours is plotted. This plotting is, for example, performed as follows: since localization man-hours for Source A is "1", its cumulative percentage of localization man-hours is "8%"; since localization man-hours for Source B is "2", its cumulative percentage of localization man-hours (a proportion obtained by dividing the localization man-hours for Source A of "1"+the localization man-hours for Source B of "2" by "12" as an overall sum of localization man-hours) is "25%". Since a program is comprised only of three files, Sources A thru C, in the present embodiment, a cumulative percentage for Source C shall become 100%.

If all man-hours for localizing all environment-dependent portions are equal and the environment-dependent portions are evenly distributed to all files, the area of a region (iv) between the Lorenz curve 600 and the graph's diagonal line (line of perfect equality) 601 becomes "0". Conversely, if all environment-dependent portions are concentrated (localized) into Source C, the areas of (1), (ii), and (iii) become "0" and the area of (iv) becomes maximum. This area of (iv) is called a "Gini coefficient" which is a value of quantifying a degree of how an event is concentrated in a Lorenz curve. That is, the smaller the Gini coefficient, the degree of concentration (degree of localization) of an event will be lower; the larger the Gini coefficient, the degree of concentration (degree of localization) will be higher. By using this Gini coefficient, it is possible to quantify a degree of how a program depends on environment. However, to calculate a value that becomes larger, the higher the degree of dependence on environment, it is preferable to use a total of the areas of (i), (ii), and (iii) instead of the Gini coefficient. In the present embodiment, a total of the areas of (i), (ii), and (iii) is calculated as a degree of dependence on environment, as illustrated in FIG. 6. The calculation processing is executed by the degree of dependence on environment calculation processing unit 204 in response to an instruction from the visualization processing unit 201. A calculated degree of dependence on environment is visualized, such as being displayed in an upper part of a screen, as illustrated in FIG. 6. By applying a Lorenz curve, as in FIG. 6, it is possible to visualize a degree of how environment-dependent portions of a program are distributed to a plurality of files and directories. Moreover, an effect of localizing environment-dependent portions can be calculated, based on a Gini coefficient of a Lorenz curve.

In step 507, the degree of dependence on environment calculation processing unit 204 further calculates and visualizes an effect of localizing the environment-dependent portions. The effect of localizing the environment-dependent portions is calculated by evaluating it, based on a difference between degrees of dependence on environment before and after localization on localizing the environment-dependent portions, as illustrated in FIG. 6. For instance, if environment-dependent portions of Source A have been localized to Source C, the number of environment-dependent portions of Source A becomes 0 and the area of (i) becomes 0. Likewise, the area of (ii) and the area of (iii) also decrease (since a cumulative percentage is plotted on the Y axis, localizing environment-dependent portions of Source A that is near to the origin results in a decrease in the areas (ii) and (iii)). A value obtained by subtracting the areas of (i), (ii), and (iii) before localization from the areas of (i), (ii), and (iii) after localization indicates the effect of localizing environment-dependent portions included in Source A. According to this method of calculation, a higher effect is obtained when localizing environment-dependent portions for which localization main-hours are larger (consequently, reconsidering the design may be required) in a file that is nearer to the origin (the number of environment-dependent portions existing within the file is fewer). Since localization has a purpose of reducing the number of files including environment-dependent portions, it is enabled to carry out a localization operation more efficiently according to this method.

There are various ways to visualize a localization effect. For example, it is conceivable that moving a mouse pointer to Source A provides a popup display of a localization effect for Source A subjected to localization. Alternatively, such a way of visualization is conceivable that a list of localization effects for the respective source files subjected to localization is displayed in table form at the right side of the Lorenz curve graph. The calculation processing is executed by the degree of dependence on environment calculation processing unit 204 in response to an instruction from the visualization processing unit 201.

Visualization of localization man-hours using a Lorenz curve, as in FIG. 6, makes it easy to institutively grasp a distribution of environment-dependent portions. Moreover, the visualization may include displaying values obtained based on a Lorenz curve and a Gini coefficient in another form, not only displaying a graph of a Lorenz curve as is.

Step 508 is a step to terminate the visualization process started at step 500. The visualization processing unit 201 provides a button display for terminating the visualization to the user of the program's dependent portions visualizing program 200 through GUI or the like, thus terminating visualization.

While a common embodiment of the present invention has been described hereinbefore, the visualization method described in the present embodiment is exemplary and is not intended to limit its processing details and procedure.

In the present embodiment described hereinbefore, it is possible to quantitatively visualize a degree of how microcomputer-dependent portions within source codes are distributed or localized. It is also possible to quantitatively visualize an effect of making a subset of source files free from microcomputer-dependent portions. That is, in particular, it is possible to visually judge with ease a degree of how environment-dependent portions of a program are distributed to a plurality of files. It is also possible to automate an estimate of development man-hours for localizing environment-dependent portions. It is also possible to present a clear guidance in determining with which environment-dependent portion to begin localization to enable to perform a porting operation efficiently.

The foregoing configuration may be built on a single computer or any subset of the input device, output device, processing device, and storage device may be built on another computer connected via a network. Moreover, environment-dependent portions data and program structure data may be accessible from a computer and their physical locations are of no matter. Moreover, environment-dependent portions data and program structure data may be contained in a signal database or may be composed of a plurality of databases having correlated data.

The present invention is not limited to the described embodiment and various modifications are included therein. For example, a subset of the components of an embodiment can be replaced by components of another embodiment. To the components of an embodiment, components of another embodiment can be added. For a subset of the components of each embodiment, other components can be added to the subset or the subset can be removed or replaced by other components. Moreover, a subset or all of the aforementioned components, functions, processing units, processing means, etc. may be implemented by hardware; for example, by designing an integrated circuit to implement them. Information such as a program implementing the respective functions, tables, and files can be placed in a recording device such as a memory, hard disk, and SSD (Solid State Drive) or a recording medium such as an IC card, SD card, and DVD.

Moreover, lines or dotted lines in a drawing which are considered as necessary for explanation are depicted and all lines and dotted lines are not necessarily depicted.

INDUSTRIAL APPLICABILITY

Application for a technology for visualizing a program's structure and characteristic is possible.

REFERENCE SIGNS LIST

100: information processing device,
101: central arithmetic device,
102: input device,
103: secondary storage device,
104: main storage device,
105: display device,
106: bus,
107: communication device,
201: visualization processing unit,
202: environment-dependent portions aggregation processing unit,
203: localization man-hours calculation processing unit,
204: degree of dependence on environment calculation processing unit,
211: environment-dependent portions data,
212: program structure data.

The invention claimed is:

1. A device that improves localization for visualizing dependent portions of a program comprising:
an input device,
an output device,
a storage device, and
an arithmetic device comprising a visualization processing unit, an environment-dependent portions aggregation processing unit, a localization man-hours calculation processing unit, and a degree of dependence on environment calculation processing unit, wherein
the arithmetic device uses environment-dependent portions data, comprising information regarding a plurality of programs and having tuples of information identifying each of the plurality of programs and data relevant to environment-dependent portions included in the plurality of programs, which has been stored in the storage device or which is input from the input device;
the environment-dependent portions aggregation processing unit identifies environment-dependent portions in each of the plurality of programs, based on the environment-dependent portions data, and aggregates the environmental-dependent portions;
the localization man-hours calculation processing unit calculates localization man-hours for each of the identified environment-dependent portions, based on information corresponding to the identified environment-dependent portions;
the visualization processing unit aggregates values of localization man-hours for each of the programs, based on the calculated localization man-hours;
the degree of dependence on environment calculation processing unit calculates a Lorenz curve and a Gini coefficient for grasping a degree of how an event is concentrated, based on the aggregated values of localization man-hours per program; and
the output device displays information based on the calculated Lorenz curve and Gini coefficient.

2. The device for visualizing dependent portions of a program, according to claim 1, wherein
the environment-dependent portions data comprises:
at least one of a filename and a module name as information identifying each of the programs; and
a type of dependence on environment indicating a type of each of the environment dependent portions as data relevant to environment-dependent portions included in the programs.

3. The device for visualizing dependent portions of a program, according to claim 2, wherein:
the visualization processing unit specifies at least one of the filename and module name as units of visualization;
the environment-dependent portions aggregation processing unit aggregates the number of environment-dependent portions according to the type of dependence on environment for each of the units of visualization;
the localization man-hours calculation processing unit calculates localization man-hours for each of the identified environment-dependent portions, using at least one of information indicating the number of environment-dependent portions and the type of dependence on environment indicating the type of each of the environment-dependent portions.

4. The device for visualizing dependent portions of a program, according to claim 3, wherein:
the arithmetic device can make use of program structure data which has been stored in the storage device or which is input from the input device;
the program structure data comprises information regarding a plurality of programs and has tuples of information identifying each of the programs and data relevant to at least one of information relevant to the programs' function, characteristic, complexity, and size; and
the localization man-hours calculation processing unit calculates localization man-hours for each of the identified environment-dependent portions, using at least one of information relevant to the programs' function, characteristic, complexity, and size.

5. The device for visualizing dependent portions of a program, according to claim 4, wherein the device includes the following:
information corresponding to a line number indicating the position of each of the environment-dependent portions in each of the programs;
at least one of char type signed/unsigned, shift operation, int type length, and endian as the type of dependence on environment;

at least one of function, variable, and macro indicating a module function associated with the module name as information relevant to the programs' function;
at least one of information relevant to scope and reference relationship as information relevant to the programs' characteristic; and
information relevant to the number of lines of a program as information relevant to the programs' size.

6. A method that improves localization for visualizing dependent portions of a program to be performed using an information processing device comprising:
an input device,
an output device,
a storage device, and
an arithmetic device, wherein:
the arithmetic device uses environment-dependent portions data, comprising information regarding a plurality of programs and having tuples of information identifying each of the programs and data relevant to environment-dependent portions included in the programs, which has been stored in the storage device or which is input from the input device; and
wherein the arithmetic device executes:
an environment-dependent portions aggregation step that identifies environment-dependent portions in each of the plurality of programs, based on the environment-dependent portions data, and aggregates the environmental-dependent portions;
a localization man-hours calculation step that calculates localization man-hours for each of the identified environment-dependent portions, based on information corresponding to the identified environment-dependent portions;
a localization man-hours aggregation step that aggregates values of localization man-hours for each of the programs, based on the calculated localization man-hours; and
a visualization step that calculates a Lorenz curve and a Gini coefficient for grasping a degree of how an event is concentrated, based on the aggregated values of localization man-hours per program,
wherein the output device displays information based on the calculated Lorenz curve and Gini coefficient.

7. The method for visualizing dependent portions of a program, according to claim 6, wherein
the environment-dependent portions data comprises:
at least one of a filename and a module name as information identifying each of the programs; and
a type of dependence on environment indicating a type of each of the environment dependent portions as data relevant to environment-dependent portions included in the programs.

8. The method for visualizing dependent portions of a program, according to claim 7, wherein:
at least one of the filename and module name is specified as units of visualization, according to information that is input to the input device;
the environment-dependent portions aggregation step aggregates the number of environment-dependent portions according to the type of dependence on environment for each of the units of visualization; and
the localization man-hours calculation step calculates localization man-hours for each of the identified environment-dependent portions, using at least one of information indicating the number of environment-dependent portions and the type of dependence on environment indicating the type of each of the environment-dependent portions.

9. The method for visualizing dependent portions of a program, according to claim 8, wherein:
the arithmetic device can make use of program structure data which has been stored in the storage device or which is input from the input device;
the program structure data comprises information regarding a plurality of programs and has tuples of information identifying each of the programs and data relevant to at least one of information relevant to the programs' function, characteristic, complexity, and size; and
the localization man-hours calculation step calculates localization man-hours for each of the identified environment-dependent portions, using at least one of information relevant to the programs' function, characteristic, complexity, and size.

10. The method for visualizing dependent portions of a program, according to claim 9, wherein the method includes the following:
information corresponding to a line number indicating the position of each of the environment-dependent portions in each of the programs;
at least one of char type signed/unsigned, shift operation, int type length, and endian as the type of dependence on environment;
at least one of function, variable, and macro indicating a module function associated with the module name as information relevant to the programs' function;
at least one of information relevant to scope and reference relationship as information relevant to the programs' characteristic; and
information relevant to the number of lines of a program as information relevant to the programs' size.

11. A non-transitory computer readable medium that improves localization for visualizing dependent portions of a program, causing an information processing device comprising an input device, an output device, an arithmetic device, and a storage device to function as means for visualizing dependent portions of a program in response to an instruction from outside, the program causing the information processing device to function as if it comprises:
an environment-dependent portions aggregation processing unit that identifies the environment-dependent portions of the program, based on environment-dependent portions data which has been read in from a database program and aggregates the number of the environment-dependent portions for each of source files constituting the program or for each directory including the source files; and
a visualization processing unit that visualizes a Lorenz curve, based on the number of the environment-dependent portions aggregated by the environment-dependent portions aggregation processing unit.

12. The non-transitory computer readable medium for visualizing dependent portions of a program, according to claim 11, causing the information processing device to operate as if it comprises:
the environment-dependent portions aggregation processing unit that identifies types of the environment-dependent portions from the environment-dependent portions data which has been read in from the database program and aggregates the number of the environment-dependent portions for each type of the environment-dependent portions in response to an instruction from outside; and the visualization processing unit that visualizes the Lorenz curve, based on the number of the environment-dependent portions aggregated for each type of the environment-dependent portions by the environment-dependent portions aggregation processing unit.

13. The non-transitory computer readable medium for visualizing dependent portions of a program, according to claim 12, causing the information processing device to operate as if it comprises:

a localization man-hours calculation processing unit that identifies modules including the environment-dependent portions from the environment-dependent portions data which has been read in from the database program and calculates man-hours for localizing the environment-dependent portions, based on the number and types of the environment-dependent portions that the modules include; and the visualization processing unit that visualizes the Lorenz curve, based on the man-hours for localizing the environment-dependent portions and the number of the environment-dependent portions aggregated by the environment-dependent portions aggregation processing unit.

14. The non-transitory computer readable medium for visualizing dependent portions of a program, according to claim 13, causing the information processing device to operate as if it comprises:

the localization man-hours calculation processing unit that identifies a scope and metrics and a dependence relationship of the modules from program structure data which has been read in from the database program and calculates the man-hours for localizing the environment-dependent portions, based on these items of data; and the visualization processing unit that visualizes the Lorenz curve, based on the man-hours for localizing the environment-dependent portions and the number of the environment-dependent portions aggregated by the environment-dependent portions aggregation processing unit.

15. The non-transitory computer readable medium for visualizing dependent portions of a program, according to claim 14, causing the information processing device to operate as if it comprises:

a degree of dependence on environment calculation processing unit that calculates a degree of dependence of environment indicating a degree of how a program depends on environment, based on the number of the environment-dependent portions aggregated by the environment-dependent portions aggregation processing unit and the man-hours for localizing the environment-dependent portions calculated by the localization man-hours calculation processing unit; and the visualization processing unit that performs processing to visualize a value of the degree of dependence on environment.

* * * * *